United States Patent [19]

Hunter et al.

[11] Patent Number: 5,599,419
[45] Date of Patent: Feb. 4, 1997

[54] METHOD FOR JOINING PLASTIC MATERIALS TOGETHER

[75] Inventors: Kenneth W. Hunter, Washington; Gerald Paoletti, Eastpointe, both of Mich.

[73] Assignee: NEP Systems, Inc., Madison Heights, Mich.

[21] Appl. No.: 472,180

[22] Filed: Jun. 7, 1995

Related U.S. Application Data

[62] Division of Ser. No. 299,569, Sep. 1, 1994.

[51] Int. Cl.$^6$ ................................................. B29C 65/20
[52] U.S. Cl. .................. 156/281; 156/304.6; 156/309.9; 269/41
[58] Field of Search ..................................... 156/281, 389, 156/304.6, 556, 309.9, 499; 269/41

[56] References Cited

U.S. PATENT DOCUMENTS

| | | | |
|---|---|---|---|
| 3,276,941 | 10/1966 | Burns | 156/304.5 X |
| 4,931,618 | 6/1990 | Nagata et al. | |
| 4,978,408 | 12/1990 | Burford et al. | 156/281 |
| 5,006,198 | 4/1991 | Pasquini. | |

*Primary Examiner*—Jeff H. Aftergut
*Assistant Examiner*—Sam Chuan Yao
*Attorney, Agent, or Firm*—Brooks & Kushman

[57] ABSTRACT

A method and apparatus for joining plastic profile members together, particularly to form picture frames. The profile members are held in place by fixture members against a locator member. The locator member is withdrawn and a heated blade positioned between the ends of the profile members. The profile members are moved against the thin blade and the end surfaces are heated to an elevated temperature. The blade is removed and the ends are welded together. During a cooling period, the retracted blade can be cleaned as desired by a blade cleaning mechanism. After the joined profiles are removed, the members are returned to positions to begin another cycle.

9 Claims, 6 Drawing Sheets

5,599,419

METHOD FOR JOINING PLASTIC MATERIALS TOGETHER

This is a continuation divisional of copending application(s) Ser. No. 08/299,569 filed on Sep. 1, 1994.

TECHNICAL BACKGROUND

The present invention relates to welding machines for plastic components, and more particularly to a method and apparatus for making plastic picture frames.

BACKGROUND OF THE INVENTION

There are numerous applications known today in which plastic components and parts are secured together to form final products, or components for final products. These plastic parts can either be molded, extruded or formed in any other conventional manner. One significant use of molded and extruded plastic profiles is for picture and poster frames. In this regard, the plastic members are glued, welded or otherwise secured together at the corners to form the frames, most of which are rectangular in shape. With most picture frames, the ends of the frame members are mitered at 45° angles in order to form the corners.

Securing plastic members together to form a picture frame is a time consuming and inefficient process. Also, it is often difficult to securely join the plastic members together at the corners, or to secure them together in a uniform way without any overlap. Making a picture frame with "perfect" corners is a highly skilled operation. Frequently, the manufacture of picture frames has resulted in finished products of unacceptable quality.

It is also difficult to secure the plastic members together at the mitered corners and produce a neat and attractive appearance. Adhesives are sometimes difficult to work with and can leave unsightly drips or flashings when the final product is formed. Also, if there is any pattern, laminate or finish on the surface of the plastic members, additional care must be taken in order not to mar, crack or chip the surface, or otherwise leave any material on it which would be visible to the observer.

SUMMARY OF THE INVENTION

It is an object of the present invention to provide an improved method and apparatus for joining plastic members together. It is another object of the present invention to provide an improved method and apparatus for forming a picture or poster frame from a plurality of plastic profile members.

It is a still further object of the present invention to provide a method and apparatus for forming plastic picture frames which is faster, less expensive, and more efficient than known methods and apparatus. It is a still further object of the present invention to provide a resistance welding apparatus and method for joining together plastic profile members, particularly to form picture and poster frames.

These and other objects, features and benefits of the invention will become apparent from the following description of the invention when viewed in accordance with the accompanying drawings and appended claims.

The present invention comprises a method and apparatus for joining plastic profile components together to form finished products, such as picture and poster frames. The members to be secured together are loaded into fixtures and clamped in place. The members are accurately positioned by a locator which retracts once the parts are securely clamped in position. A heated blade is moved into position between the ends of the members to be joined together. The parts are then pressed against opposite sides of the heated blade to soften the plastic material.

After a short period of time, the blade is retracted leaving the softened plastic portions to become firmly bonded or welded together. The members are held in that position until the material cools and the parts are permanently welded together. At the same time, a blade wiper periodically advances across the face of the retracted blade to clean any material which may have been left on it.

After the cooling period, the fixtures release the welded part so it can be unloaded from the machine. Thereafter, the fixtures and locator return to their initial or starting positions. At this point the cycle is completed and the equipment is ready to receive and weld together two more plastic members.

BEST MODE(S) FOR CARRYING OUT THE INVENTION

Figure 1:
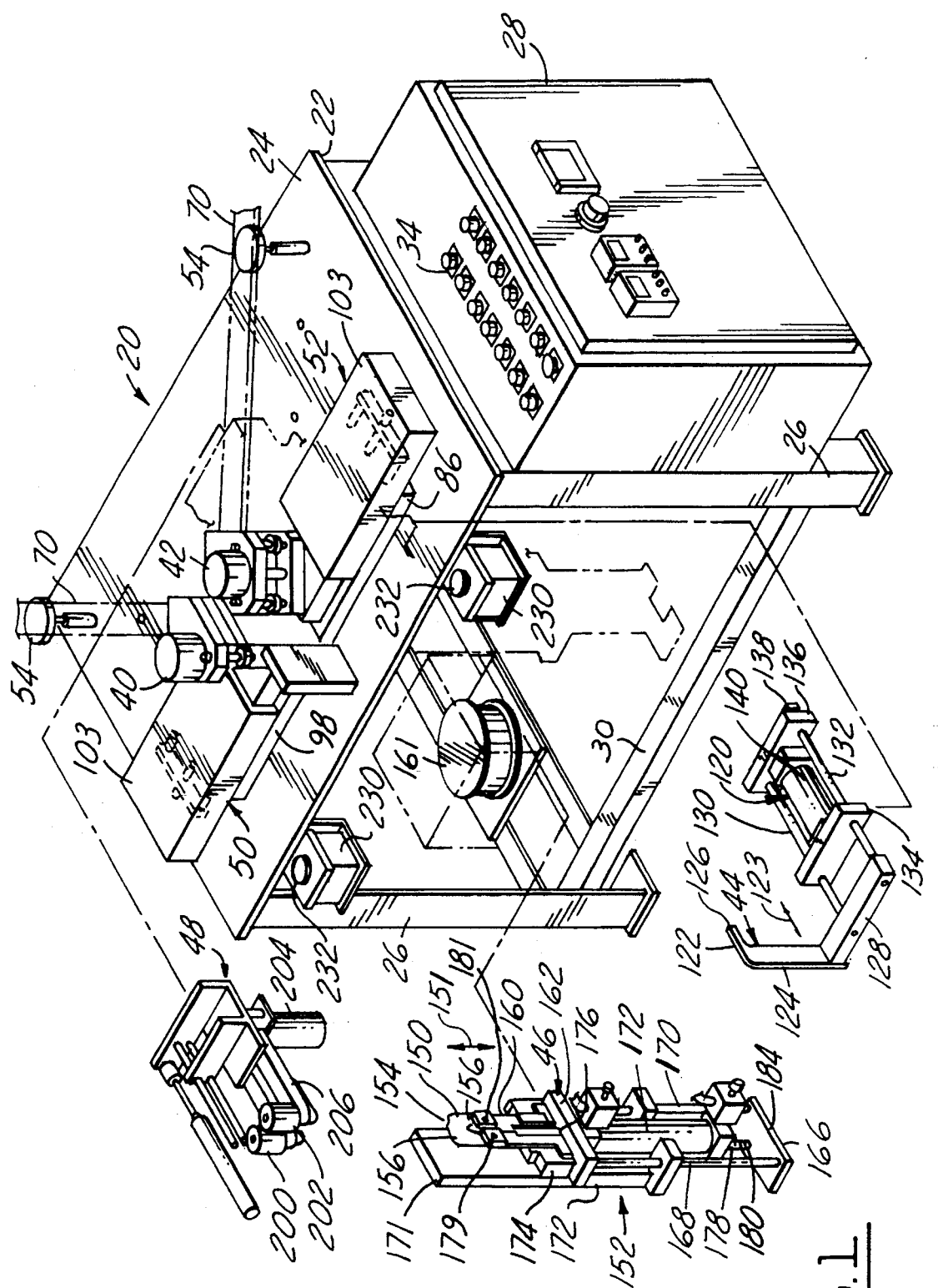
FIG. 1 is a perspective view of the present invention.
Figure 2:
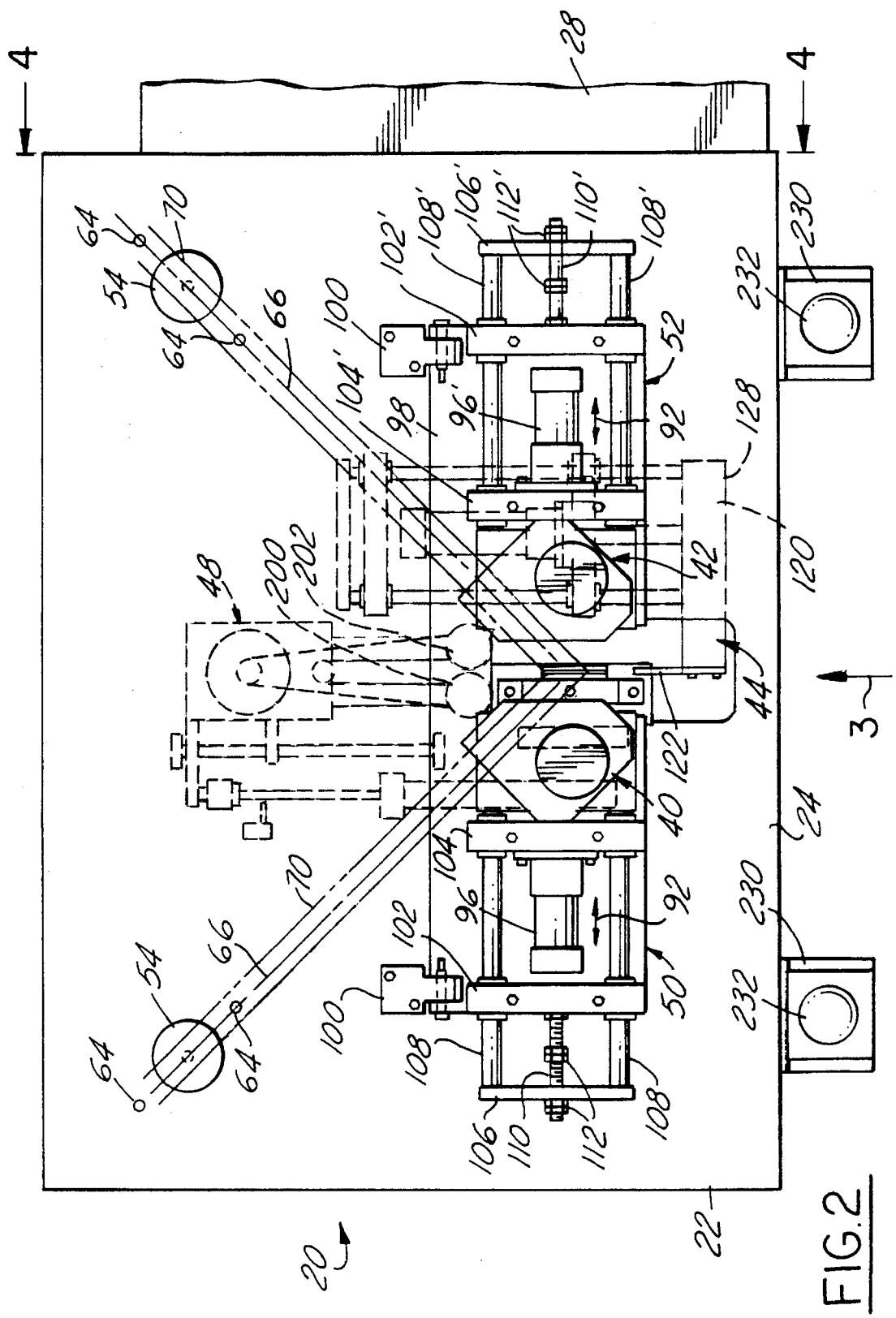
FIG. 2 is a top plan view of the present invention.

FIGS. 1–10 illustrate the presently preferred embodiment of the apparatus for the present invention. In the drawings, the invention is generally referred to by the reference numeral 20.

For convenience, the invention 20 can be positioned on, or utilized with, a table or stand 22 similar to that shown in the drawings. It is understood, of course, that the present invention 20 can be used on any surface or apparatus, or in any particular manner. Also, the table or other apparatus can be stationary or mobile, as desired.

As shown, the table 22 includes a flat upper surface 24, four legs 26 and a control box or cabinet 28. A first set of supports or cross braces 30 are attached to the legs 26 to add support and rigidity for the table. Another set of supports or brackets 32, which preferably are steel angle irons, are connected at the top or upper ends of the legs 26 and help support the table top or upper surface 24. For durability purposes, and also to provide the necessary strength as a work table, the table top, legs 26, and brackets 30 and 32 are all preferably made of metal, such as steel.

The control cabinet 28 is attached to two of the legs 26 at the end of the table 22. The control cabinet contains all of the conventional wiring and circuitry necessary to operate the invention. In this regard, a number of switches and other controls 34 are contained on the control cabinet 28 and are used to regulate and control various operations of the invention (as described herein).

The invention 20 generally comprises a number of components. These components include a pair of part holding (or clamping) fixtures 40 and 42, a locator 44, a heated blade mechanism 46, a blade cleaning mechanism 48, and a pair of sliding mechanisms 50 and 52 which control the transverse movement of the fixtures 40 and 42.

Positioned on the upper surface 24 of the table 22 are a plurality of adjustable rest pads 54. The rest pads 54 are used to support the plastic members and profiles while they are being joined together, as discussed below. Each of the rest pads 54 include a part support 56, a threaded rod 58 and a receiving post 60. The threaded rods 58 allow each of the rest pads 54 to be individually adjusted vertically. Posts 60 have pins 62 at the ends opposite the threaded rods 58. The pins 62 are adapted to be positioned in one of a series of holes 64 in the upper surface 24 of the table 22. This allows the adjustable rest pads 54 to be positioned along lines or axes 66 extending at right angles to one another on the surface of the table 22.

Figure 9:
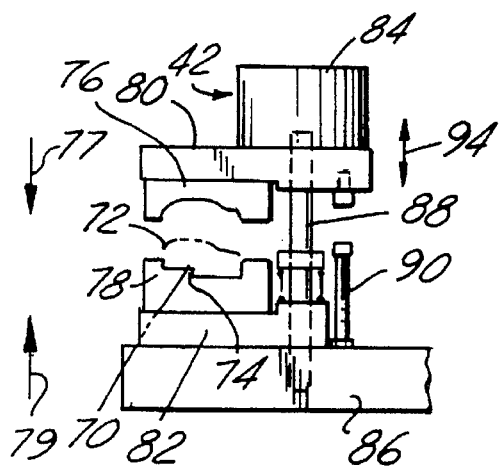
FIG. 9 is an elevational view of the part holding fixtures, taken along lines 9—9 of FIG. 8 and in the direction of the arrows.
Figure 10:
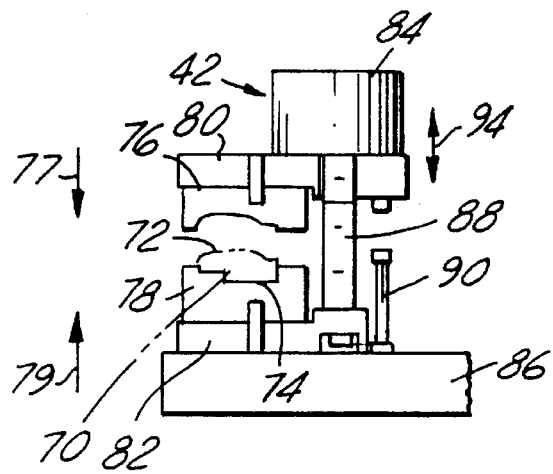
FIG. 10 is another elevational view of the part holding fixtures.

A pair of plastic profile members 70 are shown in phantom lines in the drawings. An exemplary cross section of the plastic profile 70 is shown in FIGS. 9 and 10. For convenience purposes, the profile is shown having a smooth curved upper surface 72 and a stepped or shouldered lower surface 74. It is understood, of course, that the plastic profile can have any cross-sectional size and shape with at least a part thereof fitting within the fixtures 40 and 42 of the present invention.

In order to hold the plastic members 70 in place in the fixtures 40 and 42, a pair of dies 76 and 78 are provided (see FIGS. 9 and 10). The dies 76, 78 are provided or machined to the precise profile of the plastic members 70 which are to be joined together in accordance with the present invention. This allows the plastic members 70 to be held tightly and firmly in place, without scratching or marring the surface, and also be positioned accurately in the fixtures 40 and 42 for subsequent fabrication. The dies 76 and 78 are held between fixture plates 80 and 82 in the fixtures 40 and 42. The operation of the dies 76, 78 and plates 80, 82 is controlled by a pneumatic cylinder 84. Plate 82 is secured to slide member 86. Plate 80 is connected to pneumatic cylinder 84 and moves therewith along shaft 88. Stop member 90 limits the travel of plate 80 and die 76 in the fixture 42.

As shown in the drawings, fixtures 40 and 42 are identical, except mirror images of one another. Thus, in the drawings, the corresponding parts of fixture 40 are identified by the same reference numerals used to describe fixture 42, except with a "prime" added to the reference numeral. For example, plate 80 in fixture 42 is the same as plate 80' in fixture 40.

Slider mechanism 50 is attached to fixture member 40 and correspondingly, slider member 52 is operably attached to fixture member 42. The two slider members 50 and 52 are also identical and mirror images of one another and operate to move and transversely adjust the fixtures 40 and 42 relative to one another. In this regard, the direction of travel or movement of the slider mechanisms 50 and 52 is shown by arrows 92 in FIG. 2. This movement is substantially parallel to the plane of the upper surface 24 of the table Also, the direction of movement of the plates 80 and die 76 in the fixtures 40 and 42 is shown by arrow 94 in FIGS. 9 and 10. This movement is essentially perpendicular to the surface of the table top 24.

For reference purposes, the slider mechanisms 50 and 52 will be discussed only with reference to slider member 50, since the portions of member 52 are identical and are designated by the same reference numerals followed by a "prime". The slider mechanisms 50 and 52 are mounted On a hinged plate 98 which is attached to the upper surface 24 of the table by hinges 100. Plate 98 is hinged to table 24 so that the fixtures 40, 42 and slider mechanisms 50, 52 can be raised for maintenance on other components of the invention, such as locator mechanism 44 and blade mechanism 46.

The operation of slider mechanism 50 is controlled by pneumatic cylinder 96. Slider mechanism 50 includes a pair of stationary brackets 102 and 104, a movable bracket 106 which is supported by a pair of guide rods 108, a threaded rod 110 and a plurality of fasteners (nuts) 112. The guide rods 108 are slidingly positioned in openings in the brackets 102 and 104. Bushings or bearings can be provided in the openings as desired. As discussed below, the slider mechanisms 50 and 52 are used to transversely move the fixtures 40 and 42 with the plastic members 70 held therein in the direction of the arrows 92 toward and away from one another. Also, preferably, a pair of housing members 103 (see FIG. 1) are provided to cover the slider mechanisms 50 and 52, both for aesthetic and safety purposes.

The locator mechanism 44 is used to insure that the part members 70 are correctly positioned in the fixtures in accordance with the present invention. The locator mechanism 44 has an operating mechanism 120 and a locator element 122. The locator element 122 has a vertical extending portion 124 and a protruding finger 126 which is adapted to be initially positioned between the mitered ends of the plastic profile members 70 when they are positioned in the fixtures. In this regard, the movement of the locator element is shown by arrow 123 in FIGS. 1 and 8.

The locator element 122 in turn is attached to a support 128 which in turn is held in position by rods 130 and 132 which are slidingly positioned in support brackets 134 and 136. The locator element 122 is secured to the support 128 by any conventional means, such as screw fasteners or the like. The support rods 130 and 132 are positioned in openings in the brackets 134 and 136 and connected at their opposite end to support 138.

Movement of the locator element 122 is accomplished by pneumatic cylinder 140 which is part of the operating mechanism 120. The pneumatic cylinder 140 is connected to the support 138 through an opening (not shown) in support 136 and thus operates to move the locator element 122. The cylinder 140 operates to move the support 138 which is fixedly connected to support rods 130 and 132 as well as support 128 which in turn is connected to locator element 122. Thus, when the pneumatic cylinder 140 is activated, as discussed below, the locator element 122 and in turn the locating finger 126 can be moved in and out of position at the site of contact between a pair of plastic profile members 70.

The resistance welding blade and blade operating mechanism 46 are shown in FIGS. 1–4. The blade element 150 is attached to the operating mechanism 152 and is adapted to move in and out of contact with the plastic profiles 70 held in place by the fixtures 40 and 42. The blade element 150 is made from a highly conductive metal material, such as nickel or Monel 400, but can be made of any other equivalent material. The upper edge 154 of the blade element 150 is cut or formed in order to match the profile of the plastic member 70 which are being connected together. The movement of the blade element 150 is shown by arrows 151 in FIGS. 1, 3, 4 and 6.

The blade element 150 is generally U-shaped with a pair of legs 156 separately connected to supports 158 and 160. The supports 158 and 160 are electrically connected to an appropriate power source (not shown) which provides current to the blade element 150 causing it to heat to an elevated temperature. The current to the blade and thus the resultant temperature thereof, are controlled by a transformer 161 and an appropriate control or rheostat (not shown) as are conventional in the art.

The blade element 150 and its supports are connected to a supporting bracket 162. Bracket 162 is connected and in operable association with supports 164 and 166, which are all connected together by slide rods 168 and 170. The rods 168, 170 are slidingly mounted in openings in the brackets 162 and 164. The movement of the blade element 150 in order to adjust its position relative to the plastic members 70 and fixtures 40 and 42 is operated by pneumatic cylinder 172. Pneumatic cylinder 172 is connected to a support member 174 and operates through opening 176 in bracket 162 to effectuate movement of the blade element 150 and its supports 158 and 160. In this regard, supporting member 174 is connected to support 177 which is affixed to the lower surface of the top 24 of the table 22.

Stop member 178 is provided to limit the movement of the blade mechanism. The stop member 178 comprises a threaded rod 180 and an adjustable nut or other stopping member 182. An opening 184 in the support 166 allows passage of the threaded rod 180.

When the blade mechanism 46 is activated, the blade element 150 together with supporting members 158 and 160 are moved by the pneumatic cylinder 172 into and out of engagement with the plastic profile members 70 held in the fixtures 40 and 42. In order to compensate and provide for expansion of the blade 150 when it is heated, slotted opening 179 is provided in one of the legs 156. Opening 179 allows movement of the blade relative to its fasteners 181.

Since the heated blade 150 is used to melt and thus weld together plastic materials, it can accumulate residue and excess material on it. As a result, blade cleaner mechanism 48 is provided and operates to clean the blade element 150 (see FIGS. 1 and 5–7). In this regard, the blade cleaning mechanism 48 is attached to the lower surface of the table top 24 and activated as desired in order to clean the blade element on a preselected schedule. For example, where plastic materials are used which provide a significant buildup of material on the blade each time it is used, the blade can be cleaned after each operation with the blade cleaning mechanism 48. On the other hand, where the plastic residue is not significant, the blade element 150 can be cleaned by the blade cleaning mechanism 48 every two, three, four, etc. operations as desired. The color of the plastic material utilized could also be a factor in determining the frequency of the blade cleaning cycle. Conventional timing and control mechanisms in the control box 28 are provided to accomplish this.

Figure 5:
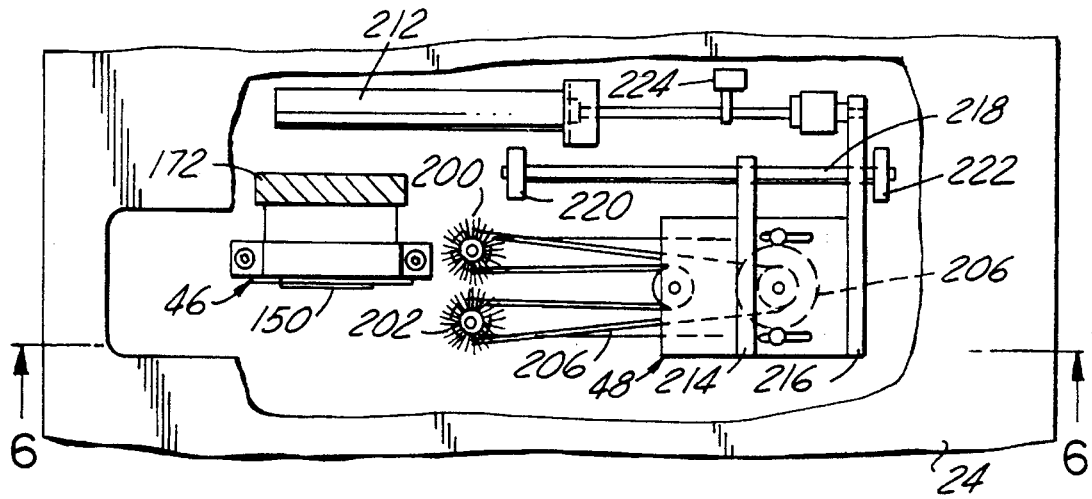
FIGS. 5–7 illustrate the blade wiping mechanism of the present invention, with FIG. 6 being a cross sectional view taken along lines 6—6 of FIG. 5 and in the direction of the arrows.
Figure 6:
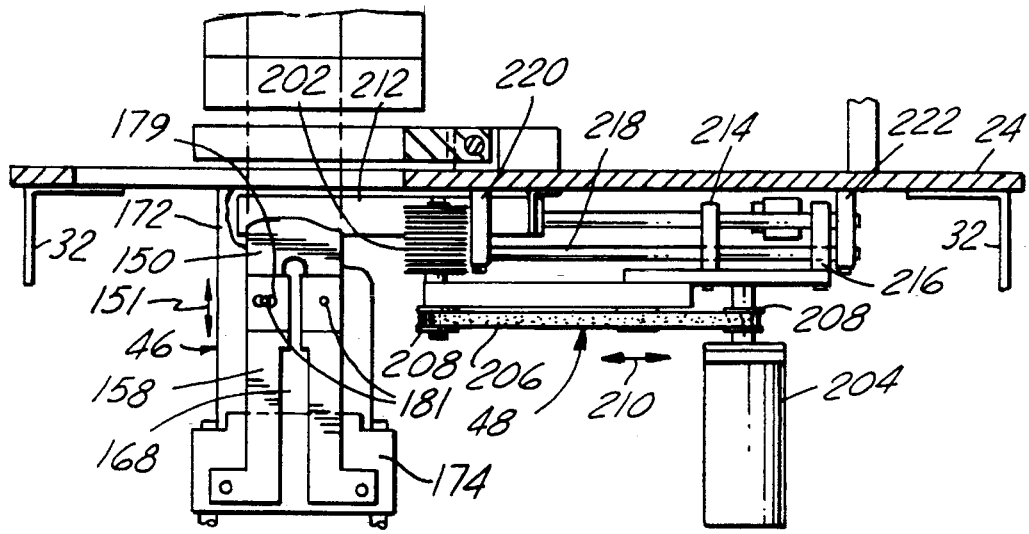
Figure 7:
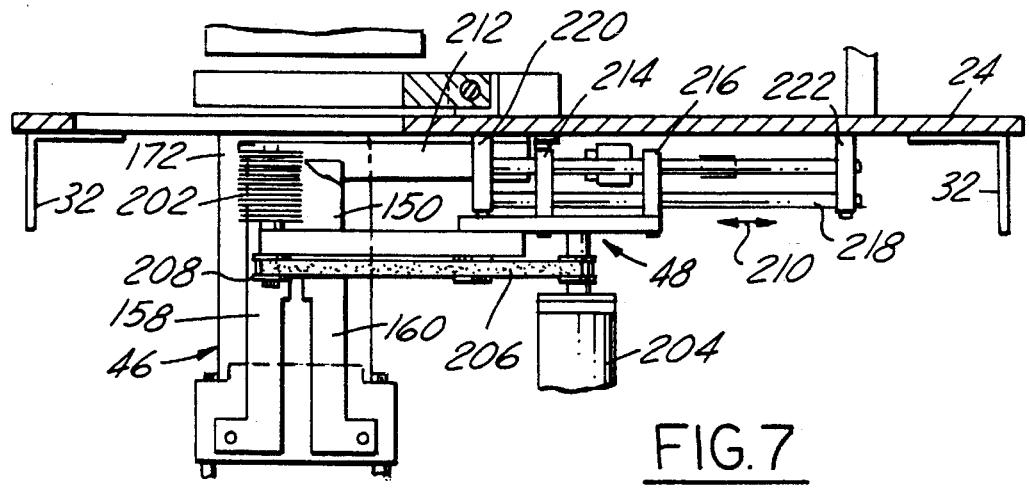
Figure 8:
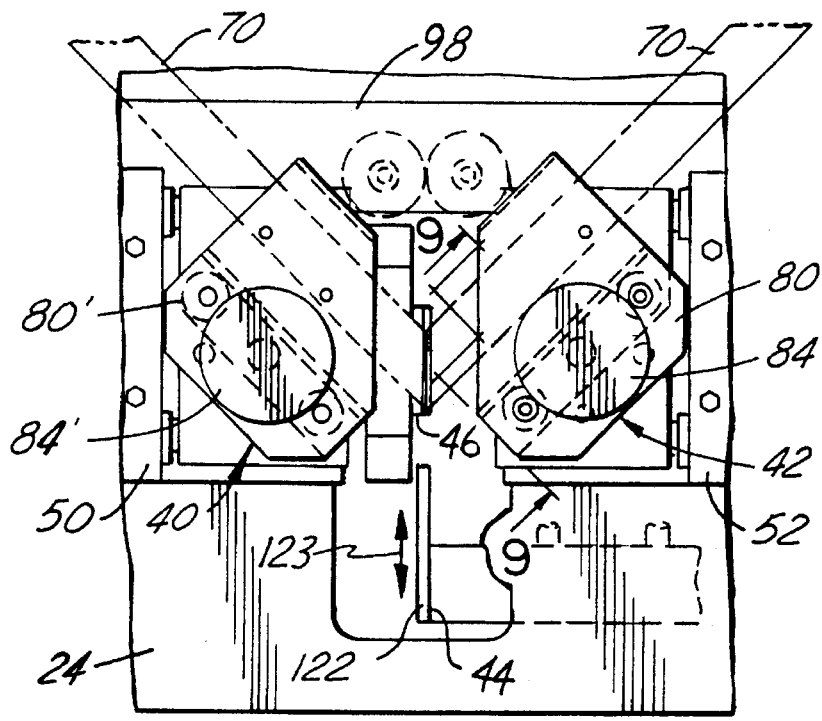
FIG. 8 is an enlarged top view of the part holding fixtures.

The blade cleaning mechanism 48 includes a pair of rotating brush members 200 and 202. These brush members preferably comprise steel wire brush elements, but can be of any comparable structure which can accomplish the same purposes. The brush members 200, 202 are rotated by motor 204 which is connected by appropriate belts 206, pulleys 208 and appropriate bearings (not shown). As shown in FIGS. 5–7, the brushes 200, 202 are adapted to be moved back and forth relative to the blade mechanism 46 in order to clean the blade element 150. This is indicated by arrow 210 in FIGS. 6 and 7. Once the blade element 150 is lowered to the position shown in FIG. 6, the rotating brushes 200, 202 are moved back and forth across the face of the blade element 150, as partially shown in FIG. 7.

The movement of the blade cleaning mechanism 48 is accomplished by pneumatic cylinder 212. The motor 204 and brushes 200, 202 which comprise blade cleaning mechanism 48 are attached by supports 214 and 216 to stationary rod 218. Rod 218 is connected by supports 220 and 222 to the bottom of the top surface 24 of the table 22. A limit switch 224 is used to regulate the back and forth movement of the blade cleaning mechanism 48.

As indicated above, the operation of the various mechanisms of the present invention are controlled through a means of appropriate circuitry in control box 28. For safety purposes, a pair of hand button mechanisms 230 are attached to the table 22 and are of a type conventionally used in industry today. The mechanisms 230 have pressure sensitive palm buttons 232 which prevent operation of the machinery until both are manually pressed.

Figure 3:
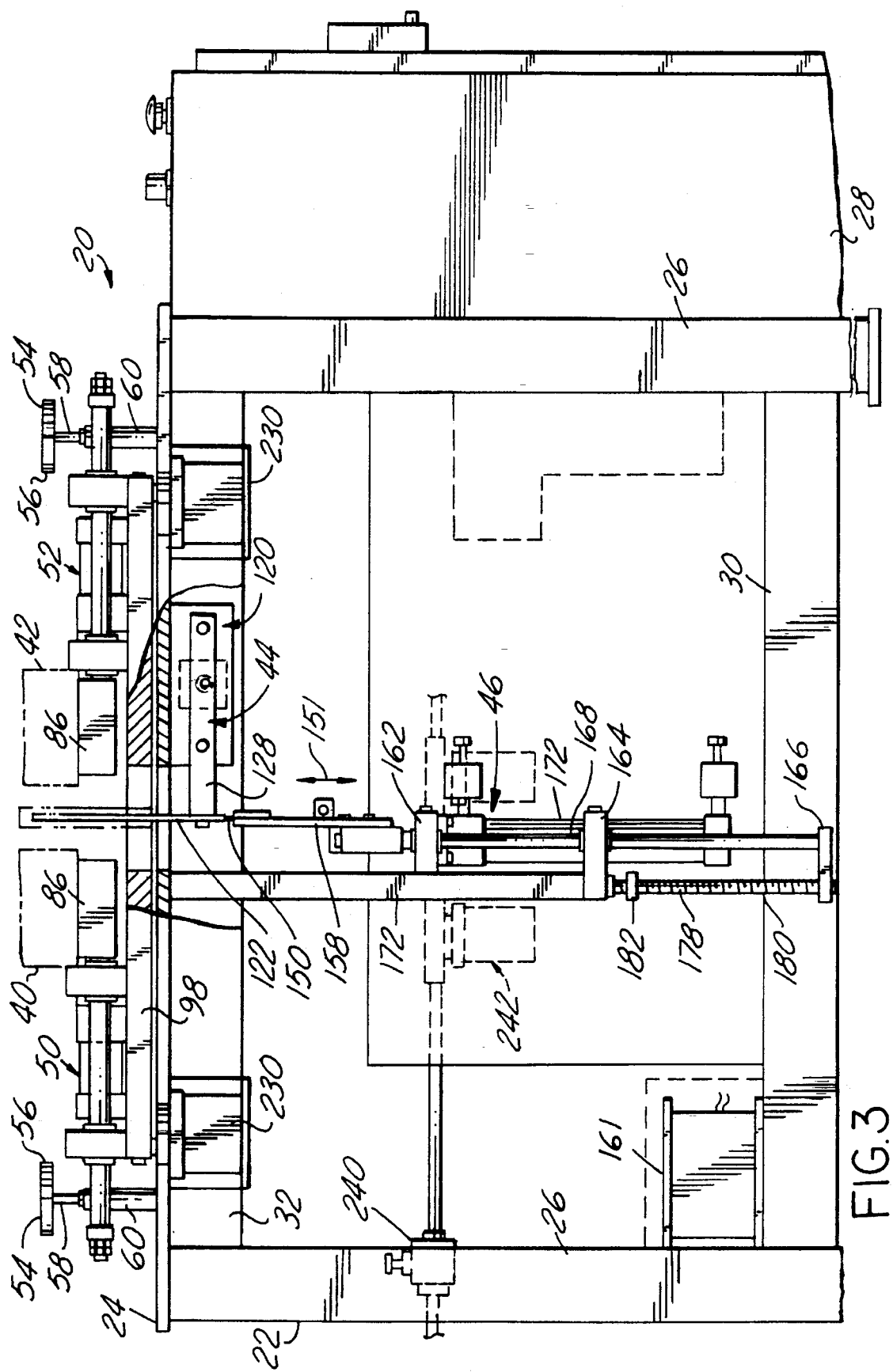
FIG. 3 is a front elevational view of the present invention.

The pneumatic pressure for the invention is supplied by a conventional source through a regulator 240 and a control mechanism 242 (see FIG. 3). Appropriate pneumatic lines (not shown) extend from the pneumatic control mechanism 242 to the various pneumatic cylinders used with the mechanisms described above. For ease of viewing the entire invention, these pneumatic lines are not shown in the drawings.

In operation of the present invention, the operator first locates two plastic parts 70 to be secured or welded together in the fixtures 40 and 42. Finger 126 of the locator element 122 is positioned at the intersection of the two plastic members 70 and the mitered ends of the plastic members are abutted firmly against the locator finger 126.

At this point, the operator simultaneously depresses the two palm buttons 232 to initiate the welding cycle. Thereafter, the pneumatic cylinders 84 in fixtures 40 and 42 operate to securely clamp the plastic members 70 therein. In this regard, in order to effectively clamp the plastic profile members in place, the clamping operation of the fixtures 40 and 42 comprises two steps. First, die 76 is moved downwardly until it rests lightly on the upper surface 72 of the plastic material 70. The direction of the movement of the die 76 is shown by arrow 77 in FIGS. 9 and 10. At this point, die 78 in support 82 is moved upwardly against the bottom surface of the profile 74 in the direction of arrows 79 in FIGS. 9 and 10. Although the movements of the dies 76 and 78 are accomplished separately and sequentially, they are both caused by a single continuous operation of the pneumatic cylinder 84 in one direction.

In this manner, the plastic profiles are tightly held and fixed firmly in place in the dies 76, 78 in the fixtures 40, 42. The additional movement of the lower die 78 which firmly clamps the profiles in the dies provides precise location of the upper surfaces 72 of the plastic profiles, thus insuring that the upper surfaces of two adjoining members will be parallel and in planar alignment with one another when the two plastic sections or materials are welded or secured together.

At this point, the locator element 122 operated by pneumatic cylinder 140 is retracted from its position between the plastic members 70. In this regard, element 122 is moved to the retracted position shown in FIGS. 2 and 4. The blade mechanism 46 is then operated which slides the blade element 150 into position directly between the two mitered ends of the plastic members 70 which are tightly held in the fixtures 40, 42. The blade element 150, of course, is heated to the desired temperature.

Figure 4:
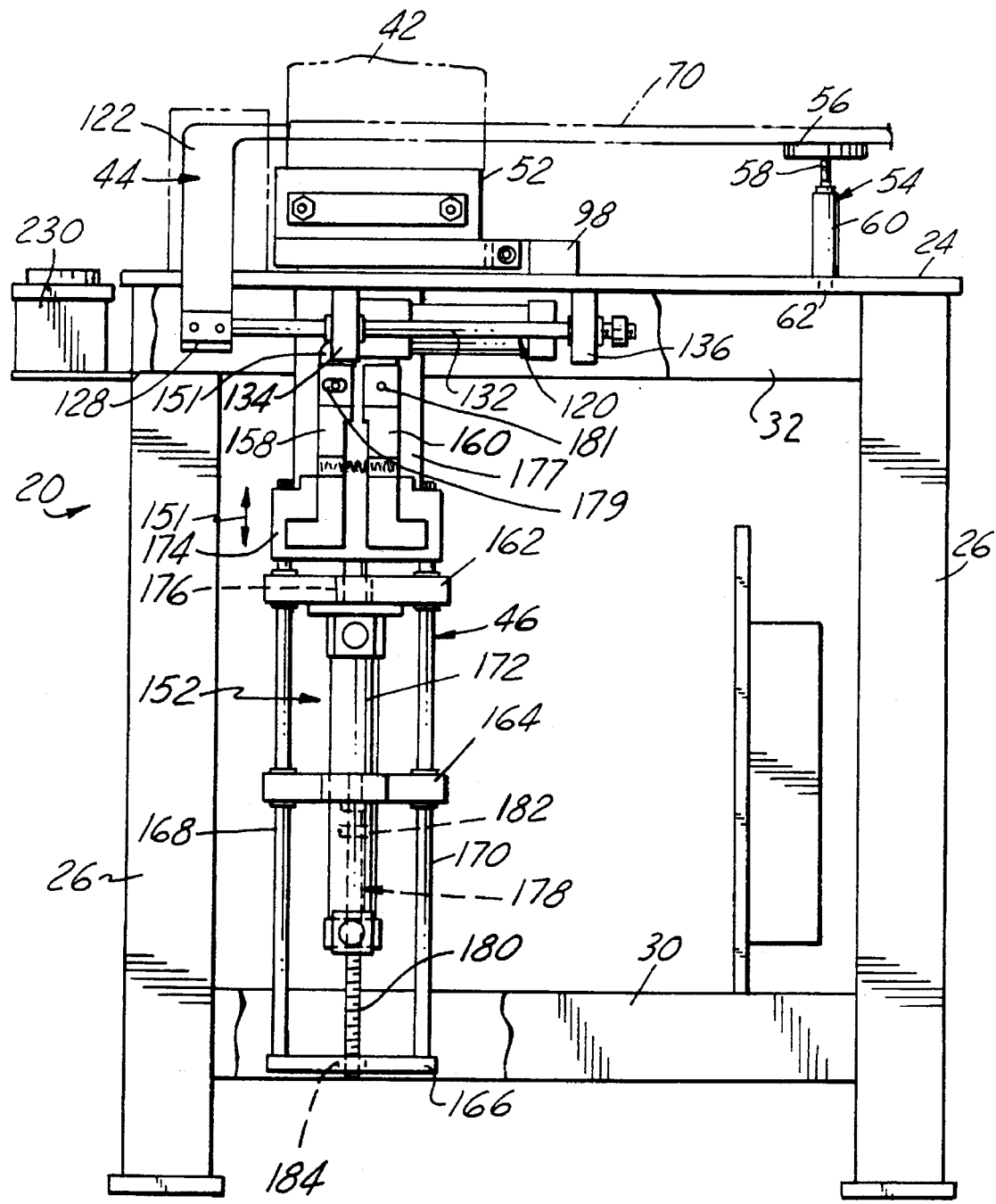
FIG. 4 is a side elevational view of the present invention.

Slides 50 and 52 then are operated by pneumatic cylinders 96 and 96', and transversely slide the two plastic members 70 against the opposite sides of the blade element 150. After a predetermined heating cycle time, typically on the order of 0.3–1.0 seconds, the blade element 150 is retracted by blade mechanism 46 to its starting position (as shown in FIGS. 4 and 6).

When the blade element 150 is raised to the space between the plastic members 70, the height of the upper edge 154 is adjusted such that it is positioned at or preferably slightly below the upper surfaces 72 of the plastic members. Preferably, the upper edge of the blade is about 0.010 inches below the upper edges or surfaces of the plastic members. This allows the two plastic members 70 to be securely welded together without undesirable flashing or residue appearing above the finished joint. When the blade mechanism 46 lowers and withdraws the blade element 150 from the position between the plastic members 70, the heated plastic materials become firmly bonded together. In this regard, the blade member 150 is approximately 0.030 inches in thickness and heated to about 700° F.

Once the blade element 150 is lowered by the blade height adjustment mechanism 46, the blade cleaning mechanism 48 is activated, as desired. When the appropriate cycle is reached, which could be every cycle, the pneumatic cylinder 212 is operated which controls the cleaning mechanism 48. This in turn starts rotation of the cleaning brushes 200, 202 and causes movement of the brushes back and forth across the two opposed sides of the blade element 150.

After the heated blade 150 is withdrawn, the plastic members 70 are held in the clamped position for a predetermined time until the material cools sufficiently and the parts are firmly and permanently secured together. The length of cooling period, which typically is on the order of 3–10 seconds, is dependent upon a number of factors, such as the size and shape of the plastic members and the particular plastic material utilized.

After the cooling period, the fixtures 40 and 42 are activated to open the dies 76 and 78 a sufficient amount to release the two bonded together plastic members. An operator then unloads the welded materials from the apparatus.

Thereafter, often after a preset delay, the part locator mechanism 44 is activated and the locator element 122 is moved into the space between fixtures 40, 42 until the locator finger projection 126 is positioned at the intersecting point between new plastic members. The slide mechanisms 50 and 52 also are returned to their starting positions which allows the locator mechanism to insert the locator element 122 as indicated. At this point, the apparatus is ready for another cycle and for joining together two additional plastic members.

The time delay involved before the slides are returned to their loading position is on the order of a few seconds. Thereafter, the locator element 122 is advanced to its load position, although this could be after the slides 50 and 52 are returned to the load position. It is also possible to program a few seconds time delay at this point.

By locating from the upper finished surface of the plastic part, rather than the unfinished or lower surface, little or no flash or residue is created on the finished side of the two welded products. Preventing the heated blade from approaching the upper surface assists in this regard, as mentioned above.

With manual equipment today, in order to join plastic members together to form picture and poster frames, it is estimated that operators can glue or weld together approximately 300 frame members a day. With use of the present inventive apparatus and method, it is estimated that assembly could be increased to approximately 300 frame members per hour.

Also, although the present invention is described above with use of pneumatic pressure for operation, it is understood that other methods and systems for operation and activation of the components and mechanisms could be utilized that are within the skills of persons in the art. For example, hydraulic or electronically activated systems could be utilized.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

What is claimed is:

1. A method of joining together a pair of plastic members, the method comprising the steps of locating the plastic members in fixtures at the desired position against a locator member;

clamping the plastic members firmly in position in the fixtures;

withdrawing the locator member;

providing a thin heating member in the intersection between the plastic members;

moving the fixtures until the plastic members contact the heating member;

heating the ends of the plastic members to be joined together with the upper edge of the heating member being positioned slightly below the upper surface of the plastic members;

removing the thin heating member;

allowing the plastic members to be bonded together and to cool while the plastic members are held in the clamped position; and removing the joined plastic members from the fixture.

2. The method of claim 1 wherein the clamping of the plastic members in the fixtures comprises positioning a first fixture member against the upper surface of the plastic members and then pressing a second fixture member against the lower surface of the plastic members.

3. The method of claim 1 wherein the heating member has a profile substantially the same as the profile of the plastic members.

4. The method of claim 1 further comprising the step of cleaning said heating member after it is removed from the intersection between the plastic members.

5. A method of joining together a pair of plastic members, the method comprising the steps of locating the plastic members in fixture members;

clamping the plastic members firmly in position in said fixture members, said clamping step comprising positioning first fixture members against the upper surface of the plastic members and then pressing second fixture members against the lower surfaces of the plastic members;

heating the ends of the plastic members with a heating member in order to securely join the plastic members together, said heating member having an upper edge, said upper edge being positioned slightly below the upper surface of the plastic members; and removing the joined plastic members from the fixture member.

6. A method of joining together a pair of plastic members, the method comprising the steps of:

locating the plastic members in fixtures at the desired position;

clamping the plastic members firmly in position in the fixtures;

providing a heating member at a first position in the intersection between the plastic members;

heating the ends of the plastic members with the upper edge of the heating member being positioned slightly below the upper surface of the plastic members;

removing the heating member to a second position spaced from said plastic members; and cleaning the heating member with a cleaning mechanism while said heating member is situated in said second position.

7. The method of claim 6 wherein the clamping of the plastic members in the fixtures comprises positioning a first fixture member against the upper surface of the plastic members and then pressing a second fixture member against the lower surface of the plastic members.

8. The method of claim 6 wherein said heating member comprises a movable blade and heating mechanism and said blade is moved into the intersection between the plastic members and then withdrawn therefrom after the plastic members are pressed against the blade for a predetermined period of time.

9. The method of claim 6 further comprising the step of moving said cleaning mechanism back and forth across said heating member in order to clean it.

* * * * *